(12) United States Patent
Kosuge

(10) Patent No.: US 11,155,251 B2
(45) Date of Patent: Oct. 26, 2021

(54) MOTOR CONTROL DEVICE AND BRAKE FLUID PRESSURE CONTROL DEVICE FOR VEHICLE

(71) Applicant: NISSIN KOGYO CO., LTD., Tomi (JP)

(72) Inventor: Shintaro Kosuge, Tomi (JP)

(73) Assignee: NISSIN KOGYO CO., LTD., Tomi (JP)

( * ) Notice: Subject to any disclaimer, the term of this patent is extended or adjusted under 35 U.S.C. 154(b) by 30 days.

(21) Appl. No.: 16/082,825

(22) PCT Filed: Feb. 28, 2017

(86) PCT No.: PCT/JP2017/007925
§ 371 (c)(1),
(2) Date: Sep. 6, 2018

(87) PCT Pub. No.: WO2017/169474
PCT Pub. Date: Oct. 5, 2017

(65) Prior Publication Data
US 2019/0092296 A1   Mar. 28, 2019

(30) Foreign Application Priority Data

Mar. 31, 2016 (JP) .............................. JP2016-073541

(51) Int. Cl.
*B60T 8/48* (2006.01)
*H02P 7/29* (2016.01)

(52) U.S. Cl.
CPC . *B60T 8/48* (2013.01); *H02P 7/29* (2013.01)

(58) Field of Classification Search
CPC .. H02P 7/29; H02P 7/291; H02P 7/293; B60T 8/404; B60T 8/4045; H03K 5/04; H03K 5/05; H03K 7/08
See application file for complete search history.

(56) References Cited

U.S. PATENT DOCUMENTS

| 5,487,593 A * | 1/1996 | Potts ................. B60T 8/17636 |
| | | 303/11 |
| 5,704,766 A * | 1/1998 | Fennel ................. B60T 8/4059 |
| | | 303/10 |

(Continued)

FOREIGN PATENT DOCUMENTS

| JP | 2001-225734 | 8/2001 |
| JP | 2002-506406 | 2/2002 |

(Continued)

OTHER PUBLICATIONS

Australian First Examination Report dated Mar. 6, 2019, 3 pages.

(Continued)

*Primary Examiner* — Bradley T King
(74) *Attorney, Agent, or Firm* — Rankin, Hill & Clark LLP

(57) ABSTRACT

A motor control device includes a drive control device that controls turning on/off of a motor, and a voltage obtaining device that obtains a voltage across terminals of the motor. The drive control device determines whether or not the motor drive signal is OFF (ST01). If the determination is Yes, the drive control device determines whether or not the voltage across the terminals, which is obtained by the voltage obtaining device, has decreased and reached a target voltage (ST02). If the determination at ST02 is Yes, an ON time is set on the basis of the immediately preceding OFF time (ST03), and the motor drive signal is switched from OFF to ON (ST04). After the ON time elapses, the motor drive signal is switched from ON to OFF (ST05). Low-rotational-speed motor control can be performed while suppressing heat generation in a motor relay.

3 Claims, 3 Drawing Sheets

(56) References Cited

U.S. PATENT DOCUMENTS

| | | | | |
|---|---|---|---|---|
| 6,188,947 B1* | 2/2001 | Zhan | ............... | B60T 8/4059 |
| | | | | 303/11 |
| 6,299,260 B1* | 10/2001 | Hachtel | ............... | B60T 8/404 |
| | | | | 303/10 |
| 6,315,369 B1* | 11/2001 | Hirose | ............... | B60T 8/404 |
| | | | | 303/10 |
| 6,499,813 B1* | 12/2002 | Wandel | ............... | B60T 8/4036 |
| | | | | 303/11 |
| 7,021,725 B2* | 4/2006 | Kokubo | ............... | B60T 8/405 |
| | | | | 303/11 |
| 7,644,995 B2* | 1/2010 | Haller | ............... | B60T 17/22 |
| | | | | 303/11 |
| 8,746,810 B2* | 6/2014 | Atsushi | ............... | B60T 8/368 |
| | | | | 303/10 |
| 2003/0091343 A1* | 5/2003 | Chen | ............... | H02P 7/2913 |
| | | | | 388/800 |
| 2005/0069418 A1 | 3/2005 | Kokubo | | |
| 2012/0112524 A1* | 5/2012 | Shibata | ............... | B60T 13/146 |
| | | | | 303/10 |
| 2014/0060038 A1* | 3/2014 | Nomura | ............... | B60T 13/745 |
| | | | | 60/545 |

FOREIGN PATENT DOCUMENTS

| | | |
|---|---|---|
| JP | 2005-096613 | 4/2005 |
| JP | 2005-96613 A | 4/2005 |
| JP | 2006-256413 | 9/2006 |
| JP | 2006-256413 A | 9/2006 |
| JP | 2008-006901 A | 1/2017 |

OTHER PUBLICATIONS

European Search Report dated Oct. 23, 2019, 6 pages.
International Search Report, dated May 16, 2017 (May 16, 2017), 2 pages.

* cited by examiner

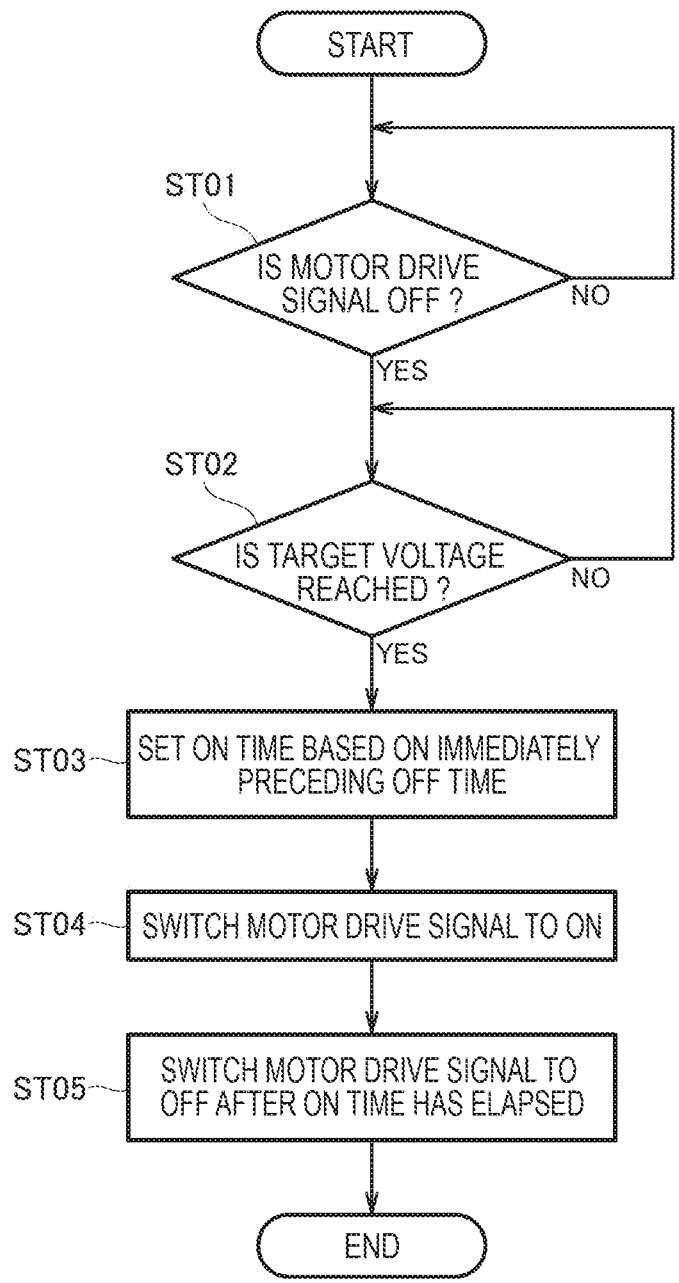

MOTOR CONTROL DEVICE AND BRAKE FLUID PRESSURE CONTROL DEVICE FOR VEHICLE

TECHNICAL FIELD

The present invention relates to a motor control device, and a brake fluid pressure control device for a vehicle.

BACKGROUND ART

Conventionally, there is a known motor control technique that uses a PWM (Pulse Width Modulation) signal to modulate a pulse width (see, for example, Patent Literature Document 1, FIG. 3).

In Patent Literature Document 1, when electricity is fed to a motor, voltage control is performed using a full operation process (full operation time TanstMax) and a cyclic operation process with a PWM signal (period TTakt).

In the meantime, the PWM control may suffer from increased generation of heat because, for example, fast switching is required between ON and OFF during the low rotational speed control with high frequency, and an amount of loss increases so that loads applied on FET (Field Effect Transistors) increase.

LISTING OF REFERENCES

Patent Literature Documents

Patent Literature Document 1: Japanese Patent Application Laid-Open Publication No. 2002-506406

SUMMARY OF THE INVENTION

Problems to be Solved by the Invention

An object of the present invention is to provide a motor control device that is equipped with a technology for performing low rotational speed control on the motor while suppressing generation of heat, and provide a brake fluid pressure control device for a vehicle equipped with such technology.

Solution to Overcome the Problems

The invention according to claim 1 is directed to a motor control device that includes a drive control device configured to perform an ON/OFF control on a motor, and a voltage obtaining device configured to obtain a voltage across terminals of the motor. The drive control device is configured such that when a motor drive signal of the motor is OFF and the voltage across the terminals of the motor, which is obtained by the voltage obtaining device, has dropped and reached a target voltage, the drive control device sets an immediately following ON time based on an OFF time, which is time from when the motor drive signal is made OFF to when the target voltage is reached, and switches the motor drive signal to ON from OFF. The drive control device is also configured to switch the motor drive signal to OFF from ON when the ON time has elapsed upon switching of the motor drive signal to ON from OFF.

The invention according to claim 2 is directed to the motor control device of claim 1, wherein as the OFF time becomes longer, the immediately following ON time is set to be shorter than when the OFF time is short. A sum of the OFF time and the immediately following ON time, which is one-period-equivalent time, is set to be longer than when the OFF time is short.

The invention according to claim 3 includes a main body that has a fluid pressure circuit therein, a motor attached to the main body, a motor control device according to claim 1 configured to control the motor, and a control valve means configured to control the fluid pressure circuit.

Advantageous Effects of the Invention

In the invention of claim 1, when the voltage across the terminals of the motor, which is obtained by the voltage obtaining device, has dropped and reached the target voltage, the drive control device sets the immediately following ON time on the basis of the OFF time, which is from when the motor drive signal is made OFF to when the target voltage is reached, and switches the motor drive signal to ON from OFF. The drive control device switches the motor drive signal to OFF when the ON time has elapsed. Unlike the cyclic control (PWM control) of the prior art, the drive control device performs the ON/OFF control with the target voltage of when the voltage across the terminals of the motor has dropped, and with the ON time based on the immediately preceding OFF time with reference to, for example, a time setting map. Therefore, it is possible to carry out the low-rotational-speed control on the motor while suppressing heat generation.

In the invention of claim 2, as the OFF time becomes longer, the immediately following ON time is set to be shorter. Also, a sum of the OFF time and the immediately following ON time, which is one-period-equivalent time, becomes longer than when the OFF time is short. Accordingly, the OFF time becomes longer and the ON time becomes shorter as the rotational speed of the motor becomes lower, for example. Also, a sum of the OFF time and the immediately following ON time, which is one-period-equivalent time, becomes longer. Therefore, it is possible to drive the motor with appropriate actuation time (drive time) in accordance with the rotational speed of the motor.

The invention of claim 3 includes a main body that has a fluid pressure circuit therein, a motor attached to the main body, a motor control device configured to control the motor, and a control valve means configured to control the fluid pressure circuit. Therefore, it is possible to reduce the operation noises and vibrations of the motor and pumps, which are driven (actuated) by the motor, in the brake fluid pressure control device for a vehicle, thereby improving the qualities of the product. When the fluid pressure is high at the pump discharge end, for example, during the fluid pressure control, greater loads act on the motor than when the fluid pressure is low, and the voltage across the terminals drops faster upon switching of the drive signal to OFF from ON. Thus, the OFF time becomes shorter. However, if the OFF time is short, the immediately following ON time is set to be long. Therefore, it is possible to sufficiently increase the motor rotational speed after switching the drive signal to ON, and appropriately drive the motor in accordance with the fluid pressure.

BRIEF DESCRIPTION OF THE DRAWINGS

FIG. 4 is a flowchart of motor voltage control.

MODE FOR CARRYING OUT THE INVENTION

An embodiment of the present invention will be described below with reference to the accompanying drawings.

Embodiment(s)

Figure 1:
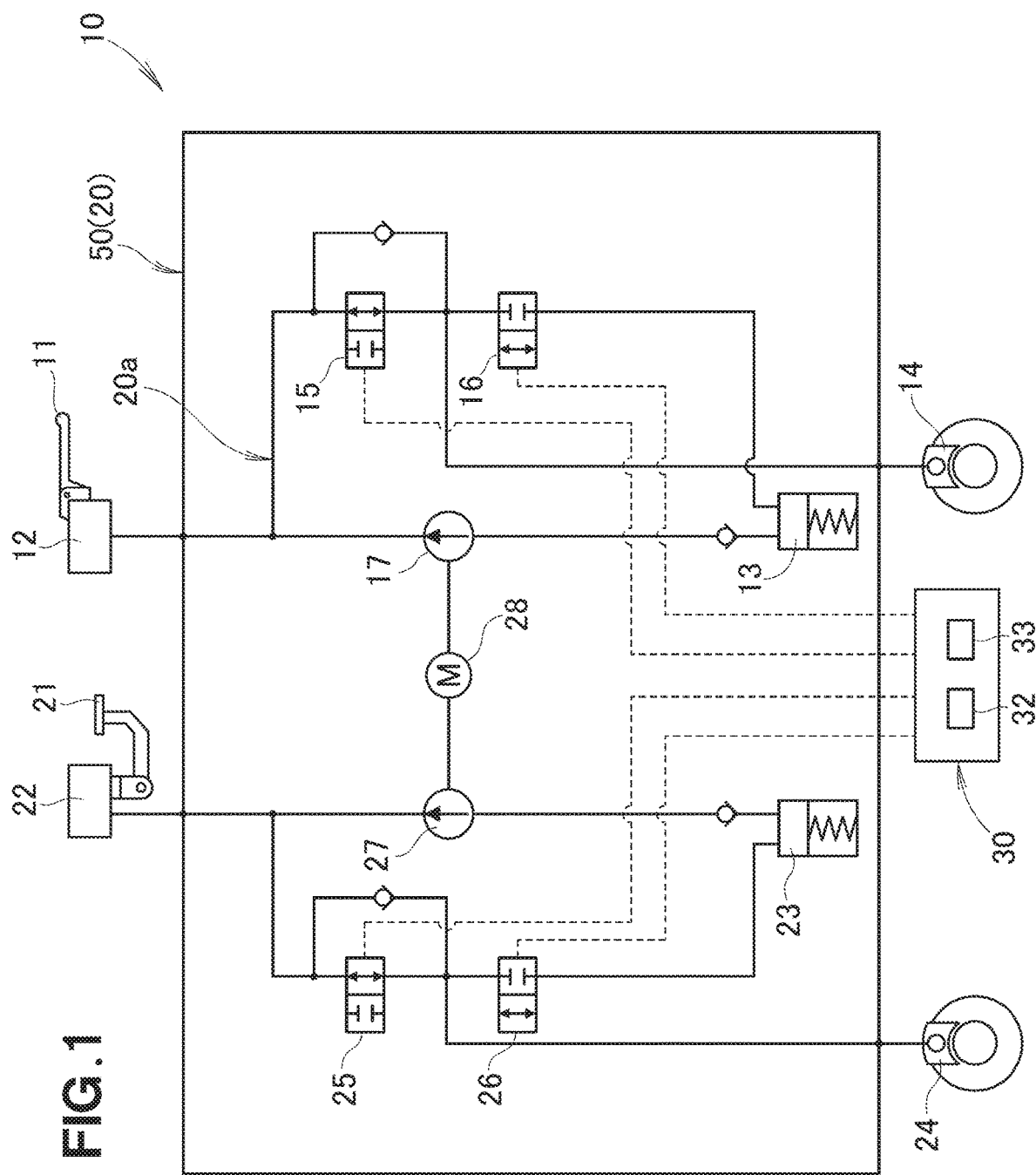
FIG. 1 is a fluid pressure circuit diagram of a brake fluid pressure control device for a vehicle, according to an embodiment of the present invention.

As shown in FIG. 1, a brake fluid pressure control device 10 for a vehicle includes, as its major elements, a fluid pressure unit 50, which has fluid passages (brake fluid passages) and various parts, and a control unit 30 (motor control unit of the present invention) to control various parts in the fluid pressure unit 50. The fluid pressure unit 50 is arranged between master cylinders 12, 22, which serve as fluid pressure sources, and front wheel brakes 14, 24.

The fluid pressure unit 50 includes the first master cylinder 12 to pressurize a working fluid in response to an operation of a brake lever 11 and generate fluid pressure, a first reservoir 13 to temporarily reserve the working fluid that is released from the front wheel brake 14, a first inlet control valve 15 (control valve means of the present invention), which is a normally open solenoid valve disposed on a fluid pressure passage from the first master cylinder 12 to the front wheel brake 14, a first outlet control valve 16 (control valve means of the present invention), which is a normally closed solenoid valve disposed on the fluid pressure passage from the first master cylinder 12 to the front wheel brake 14, and a first pump 17 to receive the working fluid from the first reservoir 13 and return it toward the first master cylinder 12.

The fluid pressure unit 50 also includes the second master cylinder 22 to pressurize the working fluid in response to an operation of a brake pedal 21 and generate fluid pressure, a second reservoir 23 to temporarily reserve the working fluid that is released from the rear wheel brake 24, a second inlet control valve 25 (control valve means of the present invention), which is a normally open solenoid valve disposed on a fluid pressure passage from the second master cylinder 22 to the rear wheel brake 24, a second outlet control valve 26 (control valve means of the present invention), which is a normally closed solenoid valve disposed on the fluid pressure passage from the second master cylinder 22 to the rear wheel brake 24, a second pump 27 to receive the working fluid from the second reservoir 23 and return it toward the second master cylinder 22, and a motor 28 to actuate the first pump 17 and the second pump 27.

The brake fluid pressure control device for a vehicle 10 also includes a drive control device 32 to control opening and closing of the first and second inlet control valves 15 and 25 and opening and closing of the first and second outlet control valves 16 and 26, and a voltage obtaining device 33 to obtain a voltage across terminals of the motor. The drive control device 32 and the voltage obtaining device 33 constitute, in combination, the control device 30 (will be described later in detail).

A fluid pressure circuit 20a having the above-described configuration is formed in a main body 20. The motor 28 is attached to (or arranged in) the main body 20. The control device 30 controls the valves 15, 16, 25 and 26 of the fluid pressure circuit 20a.

Now, the operations and functions of the brake fluid pressure control device for a vehicle 10 will be described. It should be noted that the operations and functions of a first system from the brake lever 11 to the front wheel brake 14 are the same as those of a second system from the brake pedal 21 to the rear wheel brake 24. Thus, the first system will only be described.

Firstly, fundamental operations during normal braking and ABS (Antilock Braking System) control will be described. The brake fluid pressure control device for a vehicle 10 has a function to switch between a normal state during the normal braking and states (reduced-pressure state, a holding state, and an increased-pressure state) during the ABS control.

During the normal braking: in the normal state (i.e., when no current is fed to the first inlet control valve 15 and the first outlet control valve 16), the master cylinder 12 communicates with the front wheel brake 14 (the first inlet control valve 15 is open), and the front wheel brake 14 is disconnected from the reservoir 13 (the first outlet control valve 16 is closed). As the brake lever 11 is manipulated, the working fluid pressure is applied to the front wheel brake 14 from the master cylinder 12 through the first inlet control valve 15 to brake the wheel.

During the ABS control; when the vehicle's wheel is about to lock, the control device 30 switches among the reduced-pressure state, the holding state and the increased-pressure state so as to perform the ABS control.

In the reduced-pressure state of the ABS control, a current flows to the first inlet control valve 15 and the second outlet control valve 16 such that the master cylinder 12 is disconnected from the front wheel brake 14 (first inlet control valve 15 is closed), and the front wheel brake 14 communicates with the reservoir 13 (first outlet control valve 16 is open). The working fluid flowing to the front wheel brake 14 is released to the reservoir 13 through the first outlet control valve 16, and therefore the working fluid pressure acting on the front wheel brake 14 is reduced.

In the holding state of the ABS control, the current flows to the first inlet control valve 15 only, the master cylinder 12 is disconnected from the front wheel brake 14, and the front wheel brake 14 is disconnected from the reservoir 13 (the first inlet control valve 15 and the first outlet control valve 16 are closed). The working fluid is confined in the fluid passage closed by the front wheel brake 14, the first inlet control valve 15 and the first outlet control valve 16, and the working fluid pressure acting on the wheel brake is maintained at a constant value.

In the increased-pressure state of the ABS control, the feeding of the current to the first inlet control valve 15 and the first outlet control valve 16 is halted, the master cylinder 12 communicates with the front wheel brake 14 (the first inlet control valve 15 is open), and the front wheel brake 14 is disconnected from the reservoir 13 (the first outlet control valve 16 is closed).

As a result, the fluid pressure of the front wheel brake 14 is increased by the working fluid pressure from the first master cylinder 12. During the ABS control, the control device 30 activates the motor 28 so that the first pump 17 is activated. Accordingly, the working fluid, which is temporarily reserved in the reservoir 13, is caused to return toward the first master cylinder 12.

A block diagram of the control device 30 will now be described.

The control device 30 has the drive control device 32 to control the opening and closing of the first and second inlet control valves 15 and 25, and perform the ON/OFF control on the motor 28 (to control turning on and off of the motor 28), and also has the voltage obtaining device 33 to obtain a voltage across the terminals of the motor 28.

Next, the motor drive control of the control device 30 will be described.

Figure 2:
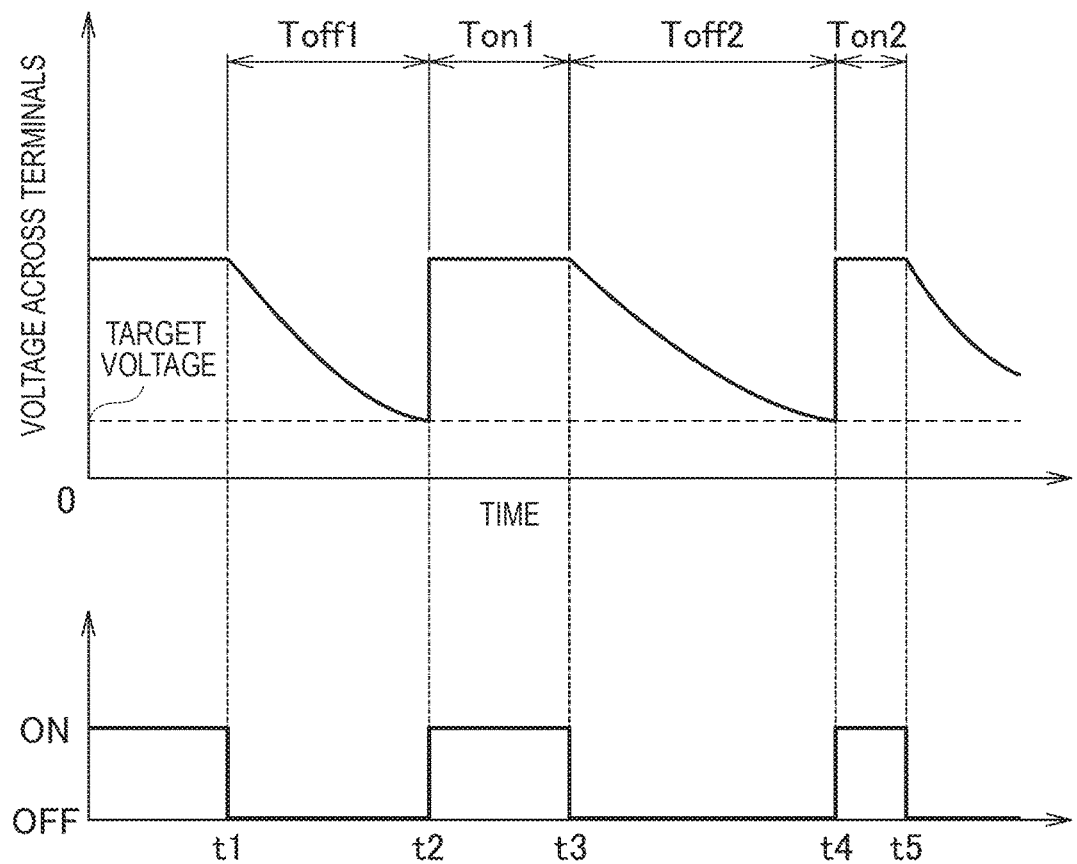
FIG. 2 is a correlation diagram between a voltage across terminals of a motor and time.

FIG. 2 schematically illustrates the motor drive control of the control device 30. As the motor 28 is switched from the ON state (electricity is fed to the motor 28 in this state) to the OFF state (time t1), the voltage VM across the terminals of the motor 28 gradually drops. When the voltage VM across the terminals reaches a target voltage VT at the time t2, the ON time Ton1 is set on the basis of the immediately preceding OFF time Toff1, and the motor drive signal is switched to ON (on signal) from OFF (off signal). The target voltage VT is decided from, for example, a target rotational speed.

Subsequently, the motor drive signal is switched to OFF from ON at the time t3 when the ON time Ton1 has elapsed. Then, the voltage VM across the terminals of the motor 28 gradually drops again. Eventually, the voltage VM across the terminals reaches the target voltage VT at the time t4 when the time Toff2 has elapsed. It should be noted that the dropping speed (OFF time) of the voltage VM across the terminals changes with variations in the outside environment and other factors, and in this embodiment we assume that Toff1 is smaller than Toff2. At the time t4, the immediately following ON time Ton2 is set on the basis of the immediately preceding OFF time Toff2, and the motor drive signal is switched to ON from OFF. Then, the motor drive signal is switched to OFF from ON at the time t5 when the ON time Ton2 has elapsed.

A time setting map to set the ON time in accordance with the OFF time will be described below.

Figure 3:
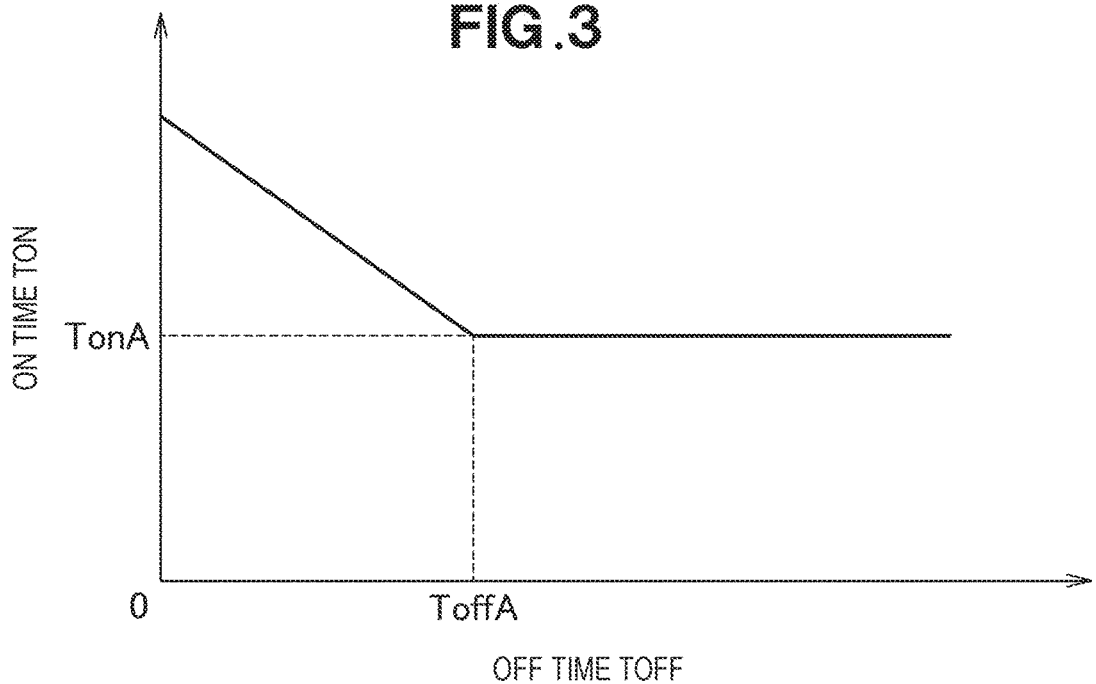
FIG. 3 is a view useful to describe a time setting map to set ON time on the basis of OFF time.

FIG. 3 shows an example of the time setting map MP. As the OFF time Toff becomes longer (larger), the ON time Ton becomes shorter in this map. Specifically, the longer (larger) the OFF time, the shorter the ON time Ton, if the OFF time is between 0 and ToffA. If the OFF time is equal to or greater than ToffA, the ON time Ton is set to a constant value TonA.

As the OFF time Toff becomes longer, a sum of the OFF time Toff and the immediately following ON time Ton, i.e., time equivalent to one period, is set to be longer than when the OFF time Toff is short.

Such time setting map ensures the minimum ON time even if the pressure of the master cylinder 12 is low. For example, if the fluid pressure on the pump discharge end is high during the fluid pressure control, a larger load acts on the motor than when the fluid pressure is low. Thus, the voltage across the terminals also quickly drops after the drive signal is switched to OFF from ON, and the OFF time becomes shorter. However, as the OFF time becomes shorter, the immediately following ON time is set to be longer. Accordingly, it is possible to sufficiently increase the motor rotational speed upon switching to ON, and it is possible to appropriately drive the motor depending upon the fluid pressure.

The control executed by the above-described brake fluid pressure control device for a vehicle 10 will be described below with reference to the flowchart. The motor actuation starts when, for example, the motor actuation conditions are met during the fluid pressure control, and the processing shown in FIG. 4 will be carried out.

As shown in FIG. 4, the drive control device 32 determines whether the motor drive signal of the motor 28 is OFF or not (STEP 01; STEP is referred to as "ST" hereinafter). For example, immediately after the start of the motor actuation, the motor drive signal is ON for a predetermined period, and then switched to OFF. If the motor drive signal is OFF (YES), the drive control device 32 determines whether or not the voltage across the terminals, which is obtained by the voltage obtaining device 33, has dropped and reached the target voltage (ST02). If the motor drive signal is not OFF (NO), the step of determining whether the motor drive signal is OFF or not is repeated.

If it is determined at ST02 that the voltage across the terminals has dropped and reached the target voltage (YES), then the drive control device 32 obtains the time from the time of making the motor drive signal OFF to the time of reaching the target voltage VT (i.e., the immediately preceding OFF time Toff), and sets the ON time Ton on the basis of the immediately preceding OFF time Toff by using the time setting map MP shown in FIG. 3 (ST03). Upon setting the ON time Ton, the drive control device 32 switches the motor drive signal to ON from OFF (ST04). After the ON time elapses upon switching of the motor drive signal to ON from OFF, the drive control device 32 switches the motor drive signal to OFF from ON (ST05).

The above-described control is not the cyclic control (PWM control) of the prior art, but performs the ON/OFF control on the motor drive signal with the target voltage when the voltage across the terminals of the motor 28 drops, and with the ON time Ton based on the immediately preceding OFF time Toff with reference to the time setting map stored in the drive control device 32. In other words, because the above-described control detects the lower limit (target voltage) of the voltage across the terminals, and sets the ON time Ton on the basis of the immediately preceding OFF time Toff, it is possible to perform the low rotational speed control on the motor while suppressing generation of the heat as much as possible.

In addition, it is possible to reduce the operation noises and vibrations of the motor 28 and the pumps 17 and 27, which are driven by the motor 28, in the brake fluid pressure control device for a vehicle 10 equipped with the control device 30 configured to perform the above-described control. Thus, it is possible to improve the qualities of the product. When the fluid pressure is high at the pump discharge end, for example, during the fluid pressure control, greater loads act on the motor than when the fluid pressure is low, and the voltage across the terminals drops faster upon switching of the drive signal to OFF from ON. Accordingly, the OFF time becomes shorter. However, if the OFF time is short, the immediately following ON time is set to be long. Thus, it is possible to sufficiently increase the motor rotational speed after switching the drive signal to ON, and appropriately drive the motor in accordance with the fluid pressure.

It should be noted that although the embodiment has described an example in which the brake fluid pressure control device for a vehicle is applied to a motorcycle, a vehicle equipped with the brake fluid pressure control device for a vehicle is not limited to the motorcycle.

INDUSTRIAL APPLICABILITY

The present invention is advantageously applied to the brake fluid pressure control device mounted on the motorcycle.

REFERENCE NUMERALS

10: Brake fluid pressure control device for a vehicle
15: First inlet control valve
16: First outlet control valve 20: Main body
20a: Fluid pressure circuit
25: Second inlet control valve
26: Second outlet control valve
28: Motor
30: Control device
31: Motor relay (FET)
32: Drive control device
33: Voltage obtaining device

What is claimed is:

1. A motor control device comprising:
a drive control device configured to perform an ON/OFF control on a motor; and
a voltage obtaining device configured to obtain a voltage across terminals of the motor,
the drive control device being configured such that when a motor drive signal of the motor is OFF and the voltage across the terminals of the motor, which is obtained by the voltage obtaining device, has dropped and reached a target voltage, the drive control device sets an immediately following ON time period based on an OFF time period, and switches the motor drive signal to ON from OFF,
wherein the immediately following ON time period, which is a length of time that the motor drive signal is ON, is based upon the OFF time period, which is a length of time from when the motor drive signal becomes OFF to when the target voltage is reached,
the drive control device is configured to switch the motor drive signal to OFF from ON when the immediately following ON time period has elapsed after switching of the motor drive signal to ON from OFF,
wherein when the OFF time period is relatively longer, the immediately following ON time period is set to be relatively shorter, and
wherein when the OFF time period is relatively shorter, the immediately following ON time period is set to be relatively longer.

2. A brake fluid pressure device for a vehicle, comprising:
a motor control device according to claim 1;
a main body that has a fluid pressure circuit therein;
a motor attached to the main body; and
a control valve means configured to control the fluid pressure circuit.

3. The motor control device according to claim 1, wherein a sum of the OFF time period and the immediately following ON time period is equal to one-period-equivalent time, and wherein the one-period-equivalent time is set to be longer when the OFF time period becomes longer as compared to when the OFF time period is shorter.

* * * * *